C. ENDORF, Jr.
VARIABLE SPEED MOTOR.
APPLICATION FILED APR. 22, 1915.
1,301,922.
Patented Apr. 29, 1919.
2 SHEETS—SHEET 1.
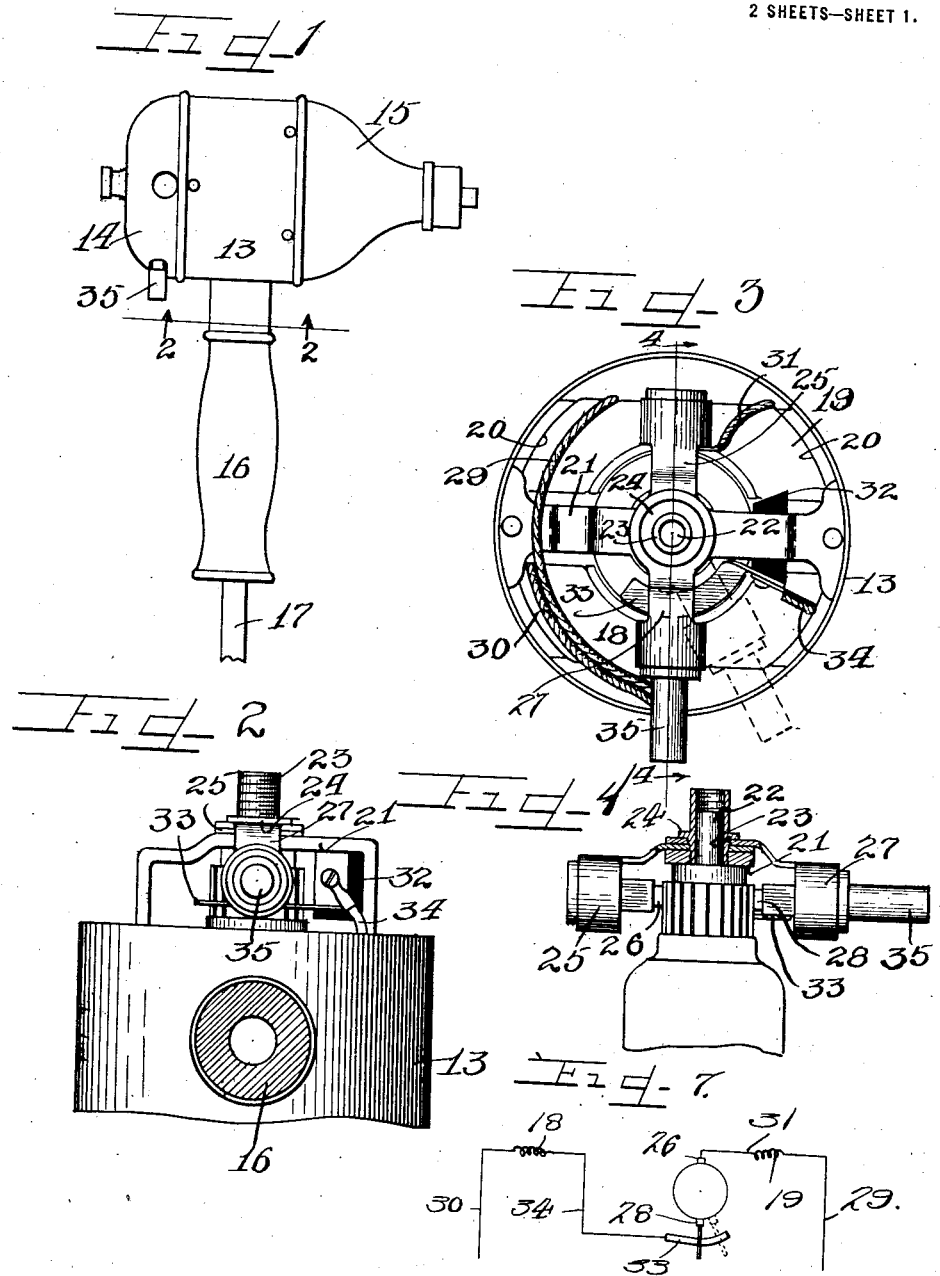

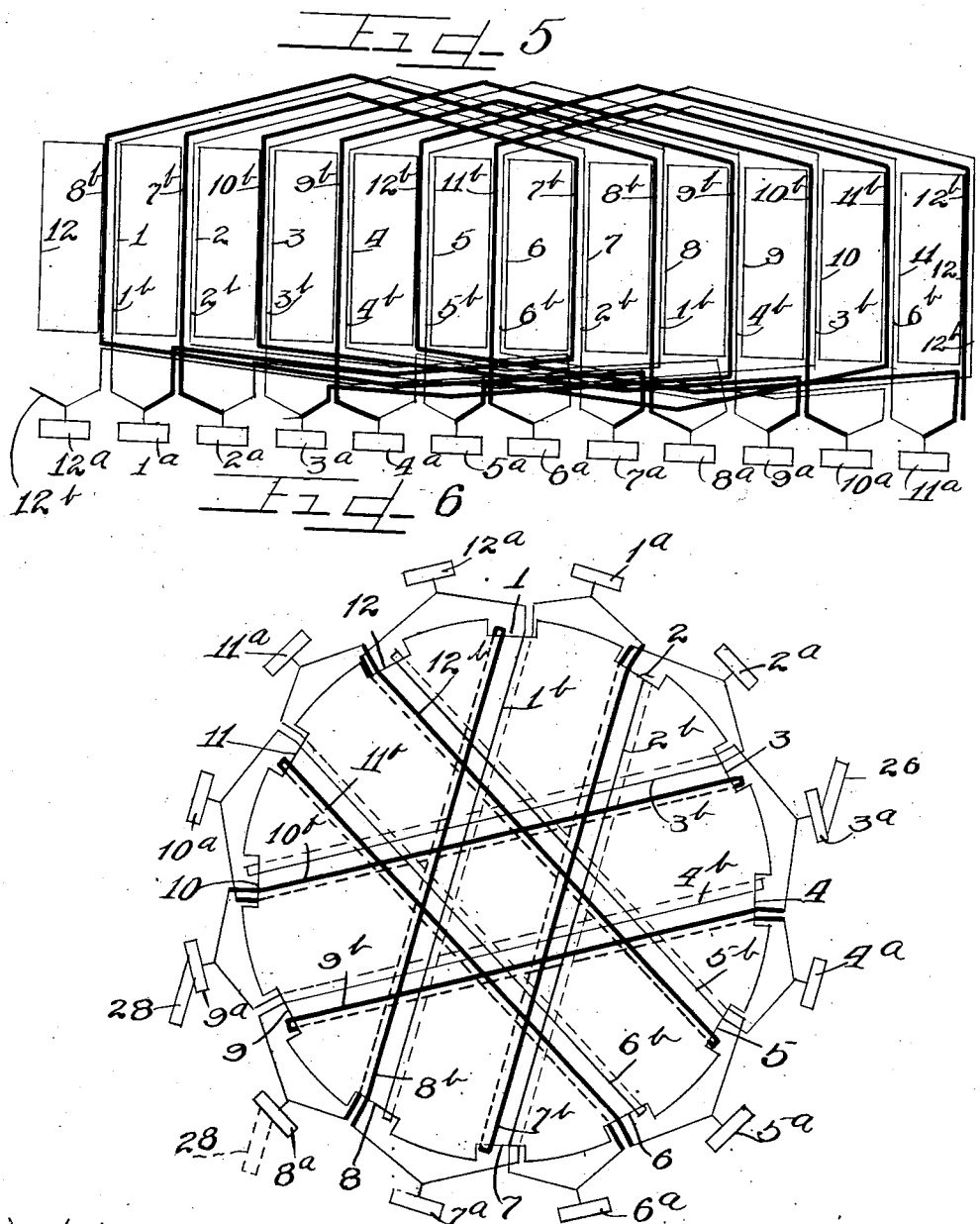

UNITED STATES PATENT OFFICE.

CHARLES ENDORF, JR., OF CHICAGO, ILLINOIS, ASSIGNOR TO THE LINDSTROM, SMITH COMPANY, OF CHICAGO, ILLINOIS, A CORPORATION OF ILLINOIS.

VARIABLE-SPEED MOTOR.

1,301,922.  Specification of Letters Patent.  Patented Apr. 29, 1919.

Application filed April 22, 1915. Serial No. 23,095.

*To all whom it may concern:*

Be it known that I, CHARLES ENDORF, Jr., a citizen of the United States, and a resident of the city of Chicago, in the county of Cook and State of Illinois, have invented certain new and useful Improvements in Variable-Speed Motors; and I do hereby declare that the following is a full, clear, and exact description of the same, reference being had to the accompanying drawings, and to the numerals of reference marked thereon, which form a part of this specification.

This invention relates to an improved type of motor capable of great variations in speed by merely adjusting the position of one of the brushes, thus particularly adapting the motor for use on small machines such as vibrators, applicators, and the like, although, of course, the principles involved may be applied to machines of larger type.

It is an object therefore of this invention to construct a motor with one brush thereof made adjustable and with the construction and association of the field and armature such that by adjusting the movable brush into various positions with respect to the other stationary brush, a great range of speed is obtained with minimum sparking in all relations of the brushes.

It is also an object of this invention to construct an improved type of variable speed motor provided with a novel form of armature winding, and with one of the brushes stationary and the other adjustable around the commutator to produce variations in speed of the motor by adjustment of the movable brush.

It is also an important object of this invention to construct a variable speed motor provided with a novel armature, each slot thereof containing two separate coils and with the various inner and outer coils in the respective slots of the armature inter-connected in a novel manner with the commutator segments, so that by use of one stationary and one adjustable brush the speed of the motor may be varied by changing the relation of the brushes.

It is furthermore an object of this invention to construct a variable speed universal motor (for direct or for alternating current) embracing an armature of novel construction, the respective slots therein each containing two independent coils with said coils interconnected with the commutator segments in a novel manner, and with brushes, one stationary and one adjustable, the adjustable brush being provided with a novel contact means and acting when shifted to change the speed of the motor.

It is finally an object of this invention to construct a simple type of variable speed universal motor, the speed of rotation of which may be changed throughout a wide range by merely shifting one brush thereof.

The invention (in a preferred form) is illustrated in the drawings and described in the accompanying specification.

In the drawings:

Figure 1 is a side elevation of a vibrator equipped with a motor embodying the principles of my invention, and provided with means on the exterior thereof for adjusting the position of a brush of the motor.

Fig. 2 is a fragmentary view taken on line 2—2 of Fig. 1, with parts broken away and showing the end casing cover or cap removed.

Fig. 3 is an end view of the motor detached from the casing, and showing an adjusted position of the brush in dotted lines.

Fig. 4 is a fragmentary detail view partly in section and partly in elevation, taken on line 4—4 of Fig. 3.

Fig. 5 is a development view of the armature and commutator showing the connections of the winding.

Fig. 6 is a diagrammatic end view of the armature showing the connections of the armature coils to the commutator segments.

Fig. 7 is a diagrammatic sketch of the motor connections.

As shown on the drawings:

Referring first to the development view shown in Fig. 5, the respective slots of the armature are denoted by the reference numerals 1 to 12 inclusive, and the corresponding commutator segments by the reference numerals 1ª, to 12ª, inclusive. The light lines designating the coils, indicate the coils first wound into the slots, there being six in number and denoted respectively by the reference numerals $1^b$, $2^b$, $3^b$, $4^b$, $5^b$, and $6^b$, and the heavy lines denoting the outermost coils in the slots or those wound over the first coils and denoted respectively by the reference characters $7^b$, $8^b$, $9^b$, $10^b$, $11^b$, and $12^b$. As clearly shown in Figs. 5 and 6, the inner coil $1^b$, is wound in the slots 1 and 8, and the outer coil $8^b$, thereover, in the same slots. Similarly the inner coil $2^b$, and outer coil $7^b$, are disposed in the slots 2 and 7, the coils $3^b$ and $10^b$, in the slots 3 and 10, the coils $4^b$ and $9^b$, in the slots 4 and 9, the coils $5^b$ and $12^b$, in the slots 5 and 12, the coils $6^b$ and $11^b$, in the slots 6 and 11. The symmetrical arrangement of the coils is evident by reference to Fig. 6, the coils progressing around the armature slots by pairs.

The inner coils $1^b$, $2^b$, $3^b$, $4^b$, $5^b$, and $6^b$, are connected to a pair of adjacent commutator segments $1^a$, $2^a$, $3^a$, $4^a$, $5^a$, and $6^a$, as clearly shown in Figs. 5 and 6, and also connected to said commutator segments are the outer coils in the adjacent slots, i. e., coil $7^b$ being connected to the commutator segments $1^a$ and $2^a$, coil $9^b$ being connected between the commutator segments $3^a$ and $4^a$, coil $11^b$, between the commutator segments $5^a$ and $6^a$, coil $8^b$, between the commutator segments $7^a$ and $8^a$, coil $10^b$, between commutator segments $9^a$ and $10^a$, and coil $12^b$, being connected between the commutator segments $11^a$ and $12^a$. It is apparent, therefore, that the inner coil of one slot is connected to the same commutator segment as the outer coil of the next adjacent slot.

Referring to Figs. 1 to 4 inclusive, the reference numeral 13, denotes a cylindrical shell, which, together with metal end cap members 14 and 15, respectively, affords a casing within which the motor is inclosed. Attached to the cylindrical member 13, is a hollow handle 16, through which a cable 17, carrying the leads to the motor, is drawn. The two poles or field coils of the motor are denoted respectively by the reference numerals 18 and 19, being rigidly secured on a built up laminated metal frame 20, and screwed or bolted to the end of said frame, is an end bearing bracket 21, for the armature shaft 22, at the commutator end of the armature, and a bushing 23, is threaded into said bracket 21, to afford a suitable bearing for the end of said commutator shaft.

Secured on said bushing between the outer surface of the bracket 21, and a flange 24, provided on said bushing is a stationary arm 25, in which is movably mounted in a well known manner a spring impelled brush 26. Also mounted upon the bushing 23, adjacent said arm 25, is a similarly constructed, but pivotally mounted arm 27, which carries a spring impelled brush 28, bearing upon the commutator of the motor.

The leads of the motor contained within the cable 17, as shown in Fig. 3, are drawn upwardly within the shell 13, and are denoted respectively by the reference numerals 29 and 30, the lead 29, being connected into the field coil 19, and the lead 30, being connected into the field coil 18. Another lead 31, passes out of said field coil 19, and is connected into the upper arm 25, for the brush 26. An insulating block 32, is rigidly secured in an angled portion of the bracket 21, and secured on said block is a curved or arc shaped resilient conductor 33, concentric about the armature shaft 22, disposed to contact the brush carrying element of the brush 28, in all positions of adjustment of the brush holder arm 27.

A lead 34, from the field coil 18, is connected to said conductor 33, on the insulating block 32, so that it is apparent therefore that the respective field coils of the poles of the motor are in series through the brushes with the armature.

For the purpose of moving the brush carrying arm 27, into various positions an actuating finger piece or short handle 35, is threaded into the outer end of said arm, and projects through a slot provided in the lower side of the end cap 14, as clearly shown in Fig. 1, for convenient actuation of the brush from the exterior of the device.

The operation is thought to be obvious from the description. However, in order to vary the speed of the motor the operator holding the vibrator by the handle 16, merely adjusts the movable brush by means of the finger actuating piece 35, into any one of its positions to vary the speed of the motor as desired. The armature, referring to Fig. 3, rotates in a clockwise direction, and moving the brush into the dotted line position at the right of the figure, serves to decrease the speed of the motor, whereas adjustment of the brush toward the left, or in the direction of rotation of the armature serves to increase the speed of rotation thereof. Due to the construction of the motor which is of a universal type, it is well adapted for use both on alternating and direct current circuits.

I am aware that details of construction may be varied without departing from the principles of this invention, and I therefore do not purpose limiting the patent granted otherwise than necessitated by the scope of the appended claim.

I claim as my invention:

In a device of the class described the combination with the field coils and armature of a motor, of a shaft supporting said armature, a commutator secured thereon, a stationary bearing bracket for the shaft at the commutator end thereof, a bushing threaded into said bracket to afford a bearing for said shaft, brushes bearing on said commutator, an arm rigidly secured to said bushing and bracket supporting one of said brushes, a second arm pivotally mounted on said bushing supporting the other brush, a curved conductor for the movable brush to afford an electric contact therefor in various positions of adjustment, said movable brush when adjusted serving to vary the speed of rotation of the armature.

In testimony whereof I have hereunto subscribed my name in the presence of a subscribing witness.

CHAS. ENDORF, Jr.

Witness:
CHARLES W. HILLS, Jr.